United States Patent

[11] 3,532,074

| [72] | Inventors | Stig Ake Gosta Svensson;<br>Vaino Maehans, Sodertalje, Sweden |
|---|---|---|
| [21] | Appl. No. | 676,285 |
| [22] | Filed | Oct. 18, 1967 |
| [45] | Patented | Oct. 6, 1970 |
| [73] | Assignee | Alfa-Laval AB<br>Tumba, Sweden<br>a Swedish corporation |
| [32] | Priority | Oct. 19, 1966 |
| [33] | | Sweden |
| [31] | | 14,208/66 |

[54] MILKING SYSTEM
14 Claims, 6 Drawing Figs.

[52] U.S. Cl. ............................................. 119/14,05,
119/14.07
[51] Int. Cl. ....................................... A01j 05/00
[50] Field of Search ............................... 119/14.07,
14.05, 14.01

[56] References Cited
UNITED STATES PATENTS
1,281,146  10/1918  Davies ................... 119/14.05
2,458,779  1/1949  Hodsdon ................. 119/14.07
2,786,445  3/1957  Golay .................... 119/14.07

*Primary Examiner*—Hugh R. Chamblee
*Attorney*—Davis, Hoxie, Faithfull and Hapgood ABSTRACT: The milking system comprises a milking unit including a claw and teat cups connected thereto, a vacuum conduit connected to the milking unit for operating the teat cups with a pulsating action, and evacuated ducts for transporting milk from the milking unit to an end unit, such as a releaser. In order to maintain a constant milking vacuum in the milking unit, the system is provided with a communicating connection between the vacuum conduit and the milk-transmitting interior of the milking unit, this connection being continuously open during the milking operation, and the system is also provided with means operable during the milking operation for periodically opening and closing the passage from the aforesaid interior of the milking unit to the milk-transporting ducts, and means for admitting air into said ducts to enable the transport of milk therein, preferably only during closure of said passage.

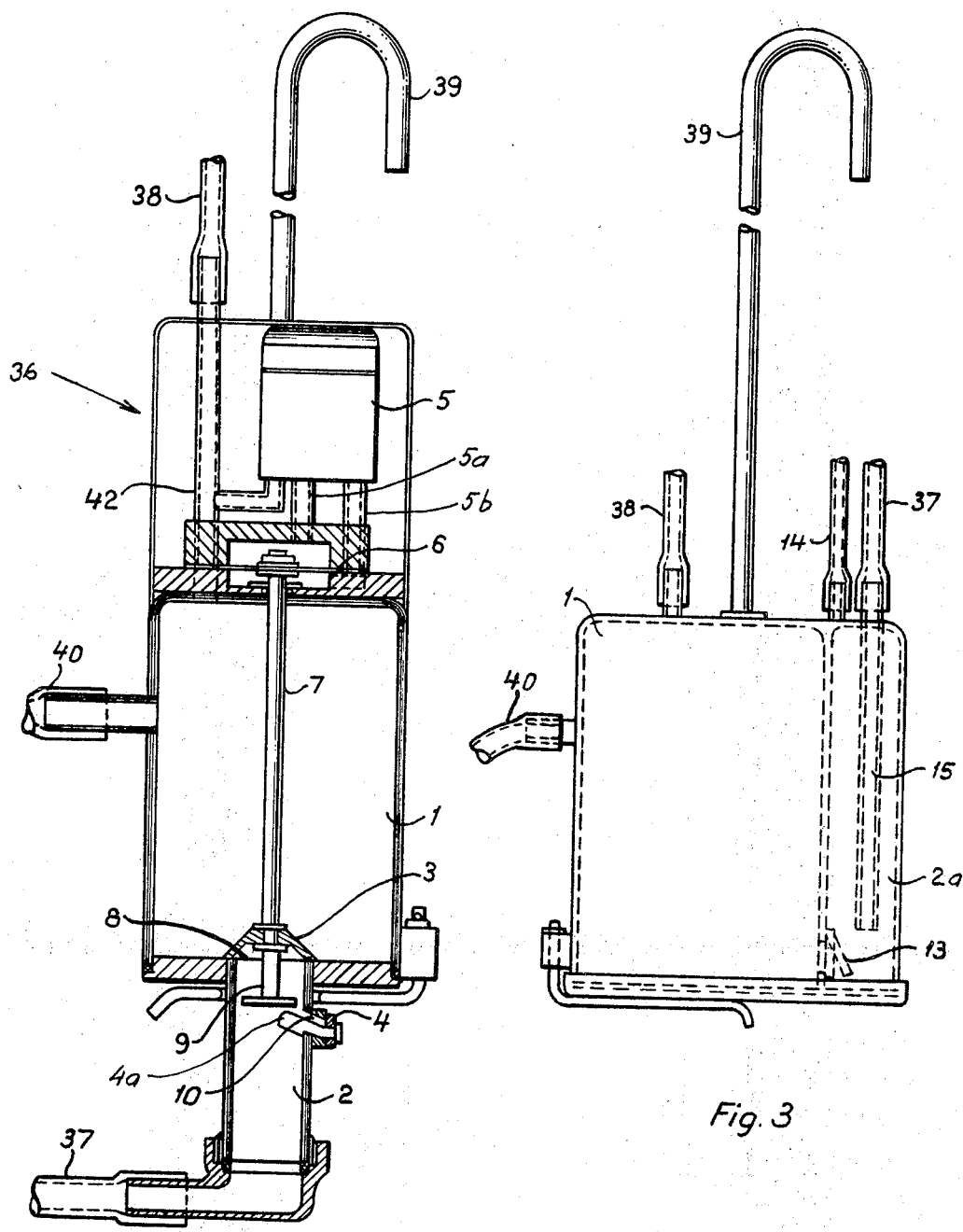

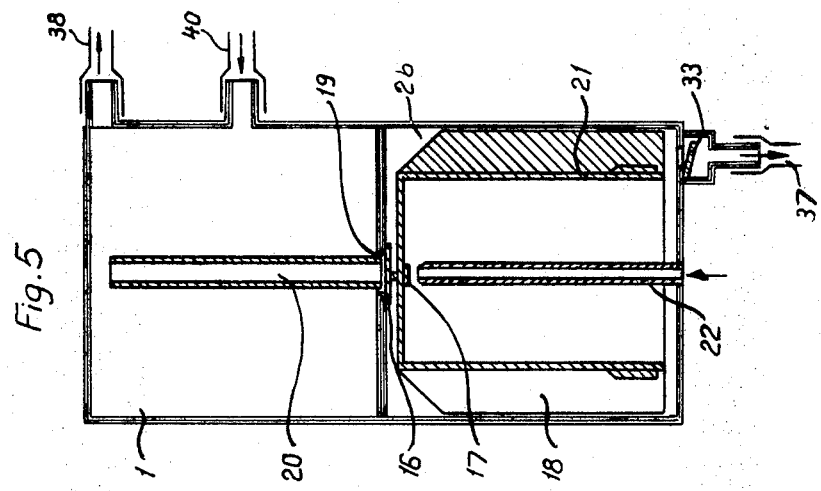
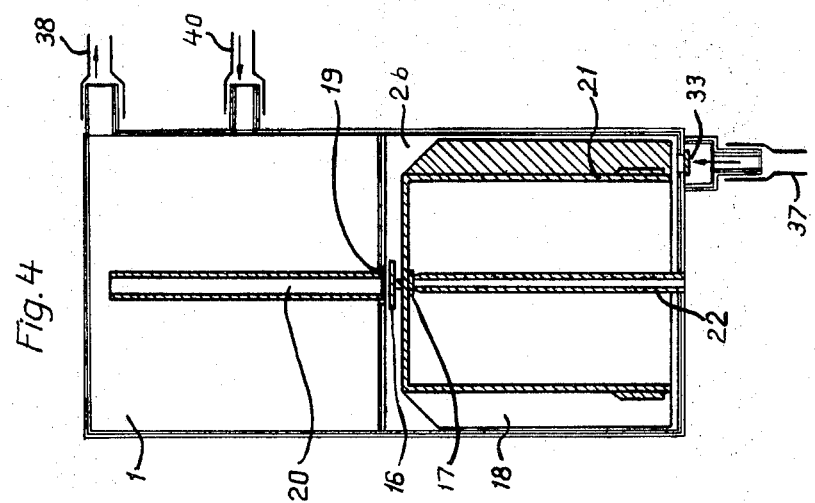

MILKING SYSTEM

THE DISCLOSURE

The present invention relates to an arrangement for keeping a constant milking vacuum in the milking unit of a milking system comprising evacuated ducts for the transport of milk from the milking unit to an end unit, for instance a releaser, and a vacuum conduit to which the milking unit is connected for the massaging function of the teat cups.

Present milking systems of the above-mentioned type have the disadvantage that the vacuum in the milking unit fluctuates. This disadvantage is especially pronounced in large systems having milk transport ducts of a total length which may be as much as several hundred meters. By "milking unit" is meant the so called teat cup claw and the teat cups connected thereto.

Because of the aforesaid fluctuation, the vacuum in the milking unit periodically cannot be kept high enough, and this has undesired consequences. The milked cows suffer from it, and it might even lead to udder diseases. Further, the milking operation takes a longer time than would be necessary if the vacuum could be kept constant. This loss of time, and consequently economical loss, can be considerable in connection with large systems serving a large herd of stock.

The reason for the aforesaid fluctuation is that the milk usually has to be raised in a vertically disposed tube a substantial height from the milking unit to a milk transport line. Obviously the milk easily causes a total blocking of this tube, so that air accompanying the milk cannot rapidly be sucked away through the evacuated milk transport line. Thus, milk blockings will develop which can result in a vacuum loss amounting to perhaps more than one meter of water-column. Similar milk blockings may easily develop even in the main line of the system of ducts for the transportation of milk; and these, of course, result in further vacuum losses.

Many unsuccessful efforts have been made to eliminate the above described disadvantages. According to one method, a higher vacuum is kept in the milk transport line than in the vacuum conduit, whereby vacuum losses at the milking unit would be avoided. This method, however, has proved difficult in practice, as it requires extremely high quality vacuum pumps to maintain the said high vacuum in the milk transport line. According to another method, milk would be positively discharged from the milking unit to the main transport line by means of a milk pump. The arrangement of an auxiliary pump at each milking unit would mean an awkward complication, of course, and it therefore has not come into use.

By the present invention, an arrangement is provided which enables the above mentioned disadvantages to be eliminated. The arrangement is intended to be a simple and unexpensive complement to present milking systems and is characterized by the combination of a continuously open connection, during the milking operation, between said vacuum conduit and the milk transmitting interior of the milking unit, means operable during the milking operation for periodically opening and closing the passage from said interior of the milking unit to the system of ducts for transportation of the milk, and means for admitting air into said system of ducts for enabling the transport of the milk therein.

A few embodiments of the present invention are described in detail below with reference to the accompanying drawings. In the drawings:

FIG. 2 is a vertical sectional view of certain parts shown in FIG. 1;

FIG. 3 is an elevational view of another embodiment of the invention;

FIGS. 4 and 5 are vertical sectional views of a further embodiment; and

Figure 1:
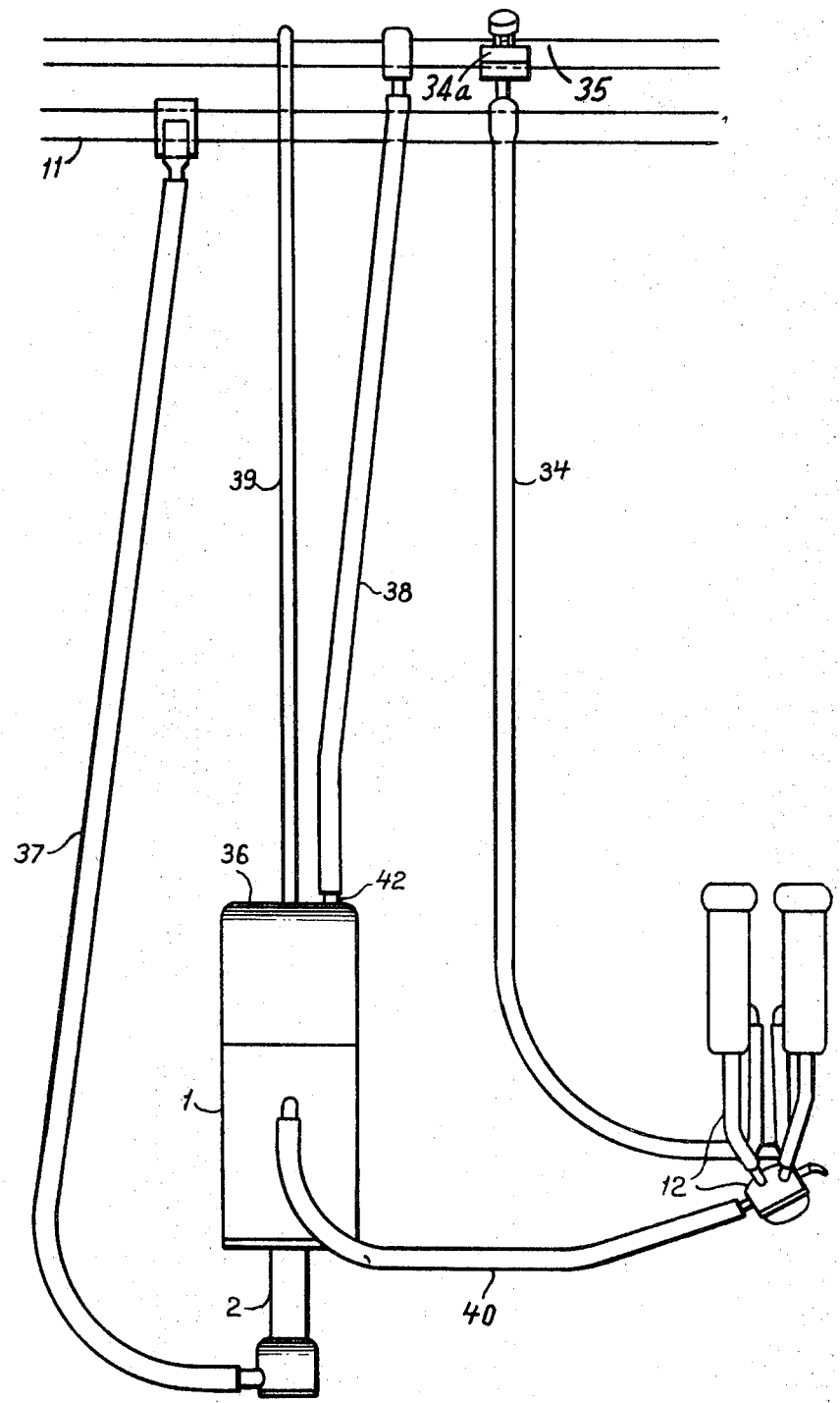
FIG. 1 is an elevational view of part of a milking system having an arrangement according to the invention.

In FIG. 1, reference numeral 1 designates a receptacle forming a chamber for collecting milk coming from a milking unit 12, this collecting chamber being confined by a separate unit 36. Milk is supplied to chamber 1 through a tube 40 leading from the claw of milking unit 12. By means of another tube 34, milking unit 12 is connected to a vacuum conduit 35 through a pulsator 34a. Unit 36 is connected to a milk transport line 11 through a tube 37 and is also connected to said vacuum conduit 35 through a tube 38. Thus, the vacuum within conduit 35 (e.g. 380 mm Hg) is prevailing in collecting chamber 1, tube 40, and milking unit 12. In milk transport tube 37 and milk transport line 11, the vacuum will always be lower and sometimes substantially lower than in conduit 35, due to circumstances mentioned previously. According to the invention, milk is passed from chamber 1 through a locking chamber 2 to transport tube 37 and line 11, whereby the effective vacuum (380 mm Hg) can be maintained in collecting chamber 1, tube 40 and milking unit 12. Unit 36 is suspended from vacuum conduit 35 by means of a hook 39.

Unit 36 is shown in detail in FIG. 2, which also shows the collecting chamber 1 for the milk coming from milking unit 12 through tube 40. Collecting chamber 1 is connected by means of a short pipe 42 and tube 38 to vacuum conduit 35. Also connected to the short pipe 42 is a pneumatic pulsator 5 arranged to control and drive a pneumatic motor 6 provided with a piston rod 7 which is reciprocated up and down by the motor. Rod 7 supports at its lower end a valve body 3 in the form of an upwardly tapering conical rubber sleeve which is arranged to close an opening 8 when rod 7 moves downward. Opening 8 constitutes a passage from collecting chamber 1 to locking chamber 2 situated beneath collecting chamber 1. Below the valve body 3, the rod 7 has an elongation 9 operable by downward movement of the rod to actuate another valve body 4. The latter valve body is a rubber flap connected to a lever 4a which is arranged in a vent opening 10, so that flap 4 is displaced to vent locking chamber 2 to the surrounding atmosphere when the inner end of lever 4a is depressed, the flap returning to its vent closing position and restoring the lever to its normal raised position when the lever is released. Locking chamber 2 is connected through tube 37 to milk transport line 11, as shown in FIG. 1.

Pulsator 5 may be of any conventional type operable from a vacuum source 42 to connect ducts 5a and 5b to vacuum and atmosphere, respectively, and periodically reverse the connections. As shown, motor 6 comprises a diaphragm partly defining upper and lower chambers communicating with the ducts 5a and 5b, respectively.

The operation of the arrangement described above is as follows. Motor 6, controlled by pulsator 5, reciprocates rod 7 upward and downward with a frequency adapted to the dimensions of all incorporated components, so that the milk entering collecting chamber 1 from tube 40 is forwarded to milk transport line 11 through tube 37. In the position shown in FIG. 2, the rod on its way downward has caused valve body 3 to close opening 8, and collecting chamber 1 is now subjected to a milking vacuum of 380 mm Hg. Within locking chamber 2, the vacuum is only about 340 mm Hg. During the continued downward movement of rod 7, its elongation 9 actuates lever 4a to displace the flap 4 so that atmospheric air is admitted into locking chamber 2. As a result, milk contained in locking chamber 2 is forced upward through tube 37 to milk transport line 11 (FIG. 1). The vacuum in collecting chamber 1 is not changed, however, because opening 8 is closed during the short time when flap 4 is displaced. Since valve body 3 consists of rubber, it is compressible axially so that opening 8 is effectively kept closed during that part of the rod movement which occurs when elongation 9 actuates flap 4 to open the vent 10. The arrangement is adjusted so that the milk level in collecting chamber 1 will rise to about half of the height of the chamber.

It will be apparent from the foregoing that the milk is passed through a locking device on its way from collecting chamber 1 to transport line 11, without disturbing the vacuum prevailing in the collecting chamber and the milking unit 12 connected thereto. The function of the locking device is, in principle, the same as that of any other locking device. The inlet 8 of the locking chamber 2 is controlled by means of valve body 3; and shortly after the valve body has closed the inlet opening 8, atmospheric air is admitted through opening 10, which action thus controls the discharge of the milk from locking chamber 2. In the upward movement of rod 7, the flap 4 is first closed by release of its lever 4a, and then the valve body 3 is raised sufficiently to open the inlet 8 to the locking chamber.

In the FIG. 3 embodiment, locking chamber 2a is arranged beside collecting chamber 1 and is connected through a tube 14 to a pulsator (not shown) of the known type which is adapted to admit atmospheric air periodically into locking chamber 2a. The milk flows from collecting chamber 1 into locking chamber 2a through a nonreturn or check valve 13. When a rush of air enters locking chamber 2a through tube 14, nonreturn valve 13 is immediately closed and the milk is forced up through an outlet pipe 15 and tube 37 to milk transport line 11. When the stream of air entering locking chamber 2a from tube 14 is interrupted, locking chamber 2a again is subjected to the vacuum prevailing within milk transport line 11, whereby milk again is allowed to flow into locking chamber 2a through nonreturn valve 13. If desired, locking chamber 2a may be alternately supplied with air and evacuated through tube 14 for the purpose of facilitating the supply of milk from collecting chamber 1 to locking chamber 2a. It is important that outlet pipe 15 to milk transport line 11 opens at a level situated above that of the nonreturn valve 13, as shown in FIG. 3, so as to assure that air admitted through tube 14 will not be forced into collecting chamber 1, thereby disturbing the vacuum prevailing therein. If the level of the milk in locking chamber 2a is lowered to the opening of outlet pipe 15, air will leave through the milk transport line and not through nonreturn valve 13, even if the latter should not close in time.

In the embodiment shown in FIG. 4 and 5, the supply of milk to locking chamber 2b is controlled by means of a nonreturn valve 33 arranged at the outlet of the locking chamber, together with a double-acting valve body 16, 17 governed by a float 18 arranged in the locking chamber. In the operating position shown in FIG. 4, milk flows from collecting chamber 1 through an opening 19 into locking chamber 2b. At this moment, the nonreturn valve 33 is closed because the vacuum is now higher in locking chamber 2b than in the milk transport line 11 to which valve 33 is connected through tube 37. Float 18 is formed as a hollow body open at the bottom and having a radial bore 21. The milk will rise within the float to the level of this bore. Outside the float the milk will rise higher until the float is lifted by the milk. The float then abuts valve body 16, 17, which is supported by the float and within certain limits is movable axially relative thereto. The upper side 16 of the valve body is then raised against opening 19 so as to close it, the valve body being retained at opening 19 by the high vacuum prevailing in chamber 1. At the same time, the lower side 17 of the valve body is raised from sealing abutment against the opening of a channel 22 leading to the outer atmosphere.

The raised operating position of valve body 16, 17 is shown in FIG. 5. As there shown, air now flows through channel 22, forcing milk from locking chamber 2b through nonreturn valve 33 into milk transport line 11. Air then passes through bore 21, the object of which is to adjust the displacement of float 18 so that its movements will be distinct. When a certain amount of milk has been forced out through tube 37, float 18, which is rather heavy, falls back to its lower position shown in FIG. 4. Valve body 16, 17 then closes air channel 22 and opens the opening 19. The small pressure difference obviously present between milk collecting chamber 1 and locking chamber 2b is equated in such a way that a small quantity of air flows up into collecting chamber 1. This quantity of air will flow up through an open ended pipe 20 arranged coaxially with opening 19. The annular gap formed between pipe 20 and the circular edge of opening 19 is filled with milk flowing downward, and despite the fact that the diameter of pipe 20 is smaller than that of opening 19, the said quantity of air will flow through the pipe 20. Thus, air does not bubble through milk present in the collecting chamber, which bubbling would lead to undesired changes in the milk. Another embodiment of the invention is constituted by a combination of the two embodiments shown in FIG. 3 and FIGS. 4 and 5. According to this embodiment, the arrangement for controlling the milk outlet from the locking chamber is constituted by means for alternately admitting atmospheric air into the locking chamber and evacuating the same, together with a nonreturn valve (line nonreturn valve 33 in FIGS. 4, 5) arranged at the milk outlet of the locking chamber. The milk outlet from the collecting chamber may be controlled by a nonreturn valve (like nonreturn valve 13 in FIG. 3) which is arranged to be opened into the locking chamber.

Figure 6:
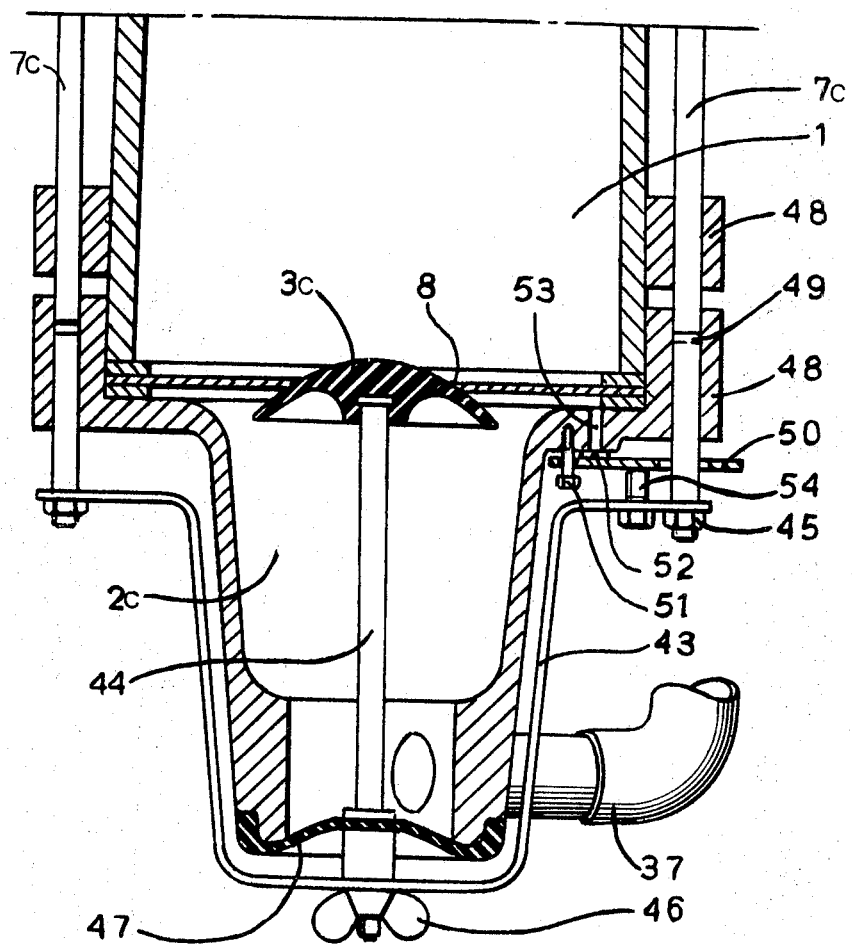
FIG. 6 is a similar view of a modification of the FIG. 2 embodiment.

In the embodiment only partly shown in FIG. 6, which is a modification of the embodiment shown in FIG. 2, the means for actuating valve body 3c comprises two rods 7c extending outside collecting chamber 1, and a crossmember 43 interconnecting the lower portions of these rods and being positively connected to the valve body through a push rod 44. crossmember 43 is secured to rods 7c by means of nuts 45 and to push rod 44 by means of a wing nut 46. The lower end wall of locking chamber 2c is constituted by a flexible membrane 47 which is sealingly connected to push rod 44 extending therethrough.

As can be seen in FIG. 6, rods 7c are guided by guiding members 48 and are divided at 49. The lower portion of one rod 7c extends with a clearance through a hole in one end-portion of a plate 50. The opposite end-portion of the plate is provided with another hole through which a screw-like member 51, secured to the wall forming the locking chamber 2c, extends with a clearance. Plate 50 has a rubber disc 52 which is arranged to close the outer opening of a channel 53 leading to the interior of locking chamber 2c, by being sucked against the opening by the vacuum prevailing in locking chamber 2c.

Crossmember 43 supports an adjustable screw 54 which, when the cross member moves upward, is arranged to tilt the plate 50 so that air is admitted into locking chamber 2c.

The embodiment shown in FIG. 6 operates as follows. Rods 7c are caused to reciprocate axially by means of motor 6 (FIG. 2). When moving downward, the rods cause opening of passage 8 between collecting chamber 1 and locking chamber 2c, whereby milk collected in collecting chamber 1 is admitted into locking chamber 2c. During this operation, channel 53 is closed. The upper parts of rods 7c are then caused to move upward and thereby leave the lower parts of the rods, which together with crossmember 43, push rod 44 and valve body 3c will rise with a little delay. Valve body 3c is returned to its closing position by the pressure difference existing between locking chamber 2c and the surrounding atmosphere, this pressure difference acting on membrane 47. During its upward movement, crossmember 43 first causes valve body 3c to close passage 8 and then, by means of screw 54, causes plate 50 to tilt so that atmospheric air is admitted into locking chamber 2c. Milk which has entered locking chamber 2c is now sucked out through tube 37 to milk transport line 11 due to the vacuum prevailing therein and the fact that air is admitted into locking chamber 2c through channel 53. The screw 54 is adjusted so that enough air is admitted into locking chamber 2c for emptying it, before the next actuation of valve body 3c by rods 7c.

Of course, other embodiments of the present invention than those described above are possible within the scope of the appended claims.

We claim:

1. In combination with a milking system including a milking unit having teat cups and also having an interior for receiving milk from the teat cups, a vacuum conduit connected to the milking unit for operating the teat cups with a pulsating action, and evacuated ducts for transporting milk from said unit to a desired destination, the system having means forming a passage for flow of milk from said interior to said evacuated ducts, an arrangement for maintaining a constant milking vacuum in said interior of the milking unit, the arrangement comprising means forming a continuously open communication between the vacuum conduit and said interior of the milking unit during the milking operation, means operable during the milking operation for periodically opening and closing said passage, and means for admitting air into said ducts to effect transport of milk through the ducts, said air admitting means including an element operable by said opening and closing means to admit air into said ducts when said passage is closed.

2. The combination according to claim 1, in which said opening and closing means include a reciprocating rod and a valve body operable by the rod to open and close said passage, said air admitting means also including a locking chamber, said element of the air admitting means being a valve body operable by the rod for admitting air into the locking chamber after closure of said passage.

3. The combination according to claim 2, in which said continuously open communicating means include a chamber for collecting milk from the milking unit, said rod extending through the collecting chamber, said passage and the locking chamber.

4. The combination according to claim 1, in which said opening and closing means include a reciprocating rod and a valve body operable by the rod to open and close said passage, said air admitting means also including a locking chamber, said element of the air admitting means being a valve body operable by the rod for admitting air into the locking chamber after closure of said passage, said first mentioned valve body being flexible in the direction of the rod movement, whereby said passage is kept closed when the rod actuates the second mentioned valve body.

5. The combination according to claim 1, in which said opening and closing means include a reciprocating rod and a first valve body operable by movement of the rod in one direction to open said passage, said valve body being movable independently of the rod to close said passage, said air admitting means also including a locking chamber, said element of the air admitting means being a second valve body operable by the first valve body to admit air into the locking chamber.

6. In combination with a milking system including a milking unit having teat cups and also having an interior for receiving milk from the teat cups, a vacuum conduit connected to the milking unit for operating the teat cups with a pulsating action, and evacuated ducts for transporting milk from said unit to a desired destination, the system having means forming a passage for flow of milk from said interior to said evacuated ducts, an arrangement for maintaining a constant milking vacuum in said interior of the milking unit, the arrangement comprising means forming a continuously open communication between the vacuum conduit and said interior of the milking unit during the milking operation, means operable during the milking operation for periodically opening and closing said passage, and means for admitting air into said ducts to effect transport of milk through the ducts, said opening and closing means including a pneumatically driven motor.

7. In combination with a milking system including a milking unit having teat cups and also having an interior for receiving milk from the teat cups, a vaccuum conduit connected to the milking unit for operating the teat cups with a pulsating action, and evacuated ducts for transporting milk from said unit to a desired destination, the system having means forming a passage for flow of milk from said interior to said evacuated ducts, an arrangement for maintaining a constant milking vacuum in said interior of the milking unit, the arrangement comprising means forming a continuously open communication between the vacuum conduit and said interior of the milking unit during the milking operation, means operable during the milking operation for periodically opening and closing said passage, and means for admitting air into said ducts to effect transport of milk through the ducts, said opening and closing means including a float-actuated valve.

8. The combination according to claim 7, in which said continuously open communication means include a chamber for collecting milk from the milking unit, said interior of the unit being constantly connected through the upper part of said chamber to said vacuum conduit, said passage being located at the lower part of said chamber, said air admitting means including a locking chamber communicating with said ducts and to which milk passes from the collecting chamber by way of said passage when the passage is open, the air admitting means also including a valve for admitting atmospheric air to the locking chamber, said opening and closing means also including a float in the locking chamber.

9. In combination with a milking system including a milking unit having teat cups and also having an interior for receiving milk from the teat cups, a vacuum conduit connected to the milking unit for operating the teat cups with a pulsating action, and evacuated ducts for transporting milk from said unit to a desired destination, the system having means forming a passage for flow of milk from said interior to said evacuated ducts, an arrangement for maintaining a constant milking vacuum in said interior of the milking unit, the arrangement comprising means forming a continously open communication between the vacuum conduit and said interior of the milking unit during the milking operation, means operable during the milking operation for periodically opening and closing said passage, and means for admitting air into said ducts to effect transport of milk through the ducts, said continuously open communication means including a chamber for collecting milk from the milking unit, said interior of the unit being constantly connected through the upper part of said chamber to said vacuum conduit, said passage being located at the lower part of said chamber, said air admitting means including a locking chamber commmunicating with said ducts and to which milk passes from the collecting chamber by way of said passage when the passage is open, the air admitting means also including a valve for admitting atmospheric air to the locking chamber, said opening and closing means including a check valve in said passage for preventing back-flow from the locking chamber into the collecting chamber.

10. In combination with a milking system including a milking unit having teat cups and also having an interior for receiving milk from the teat cups, a vacuum conduit connected to the milking unit for operating the teat cups with a pulsating action, and evacuated ducts for transporting milk from said unit to a desired destination, the system having means forming a passage for flow of milk from said interior to said evacuated ducts, an arrangement for maintaining a constant milking vacuum in said interior of the milking unit, the arrangement comprising means forming a continuously open communication between the vacuum conduit and said interior of the milking unit during the milking operation, means operable during the milking operation for periodically opening and closing said passage, and means for admitting air into said ducts to effect transport of milk through the ducts, said continuously open communication means including a chamber for collecting milk from the milking unit, said interior of the unit being constantly connected through the upper part of said chamber to said vacuum conduit, said passage being located at the lower part of said chamber, said air admitting means including a locking chamber communicating with said ducts and to which milk passes from the collecting chamber by way of said passage when the passage is open, the air admitting means also including a valve for admitting atmospheric air to the locking chamber, the combination comprising also a check valve between the locking chamber and said ducts for preventing back-flow from the ducts into said locking chamber.

11. In combination with a milking system including a milking unit having teat cups and also having an interior for receiving milk from the teat cups, a vacuum conduit connected to the milking unit for operating the teat cups with a pulsating action, and evacuated ducts for transporting milk from said unit to a desired destination, the system having means forming a passage for flow of milk from said interior to said evacuated ducts, an arrangement for maintaining a constant milking vacuum in said interior of the milking unit, the arrangement comprising means forming a continuously open communication between the vacuum conduit and said interior of the milking unit during the milking operation, means operable during the milking operation for periodically opening and closing said passage, and means for admitting air into said ducts to effect transport of milk through the ducts, said continuously open communication means including a chamber for collecting milk from the milking unit, said interior of the unit being constantly connected through the upper part of said chamber to said vacuum conduit, said passage being located at the lower part of said chamber, said air admitting means including a locking chamber communicating with said ducts and to which milk passes from the collecting chamber by way of said passage when the passage is open, the air admitting means also including a valve body for admitting atmospheric air into the locking chamber, said opening and closing means including a float located in the locking chamber and operable to close said passage in response to being raised by milk entering the locking chamber, the float being operatively connected to said valve body for opening the same in response to said raising of the float.

12. The combination according to claim 11, in which said valve body is movable relative to the float and includes a valve part operable to open and close said passage.

13. The combination according to claim 11, in which said float is a hollow body open at the bottom and having a radial bore.

14. The combination according to claim 11, comprising also an open-ended pipe extending within the collecting chamber coaxially of said passage between the collecting and locking chambers.